United States Patent [19]

O'Connor

[11] 3,825,830

[45] July 23, 1974

[54] OFFSET OSCILLATOR SYSTEM FOR RADIO TRANSMITTER AND RECEIVER

[75] Inventor: William W. O'Connor, Lombard, Ill.

[73] Assignee: Motorola, Inc., Franklin Park, Ill.

[22] Filed: Dec. 6, 1972

[21] Appl. No.: 312,460

[52] U.S. Cl. .................... 325/20, 343/180, 343/181

[51] Int. Cl. .................... H04b 1/40

[58] Field of Search .................... 325/18–23, 325/156, 158, 20; 343/180, 181, 208; 331/46, 49, 158, 161

[56] References Cited

UNITED STATES PATENTS

| | | | |
|---|---|---|---|
| 2,419,593 | 4/1947 | Robinson | 325/18 |
| 2,447,392 | 8/1948 | Byrne | 325/20 |
| 2,553,366 | 5/1951 | Fry | 331/161 |
| 2,840,714 | 6/1958 | Wulfsberg | 325/18 |
| 2,889,452 | 6/1959 | Bartley | 325/20 |
| 3,233,192 | 2/1966 | Smith | 331/161 |
| 3,581,240 | 5/1971 | Enderby | 331/161 |

*Primary Examiner*—Albert J. Mayer

*Attorney, Agent, or Firm*—Eugene A. Parsons; Vincent Rauner

[57] ABSTRACT

An oscillator system for determining the operating frequency of a transmitter and a receiver includes a receiver local oscillator and an oscillator-mixer combination for off-setting the frequency of the local oscillator to provide an excitation signal for the transmitter. The operating frequency of the transmitter and receiver can be changed by changing only the frequency of the local oscillator, thereby reducing the number of crystals or oscillators needed for a multifrequency radio. The offsetting oscillator is frequency modulated to frequency modulate the transmitter.

7 Claims, 1 Drawing Figure

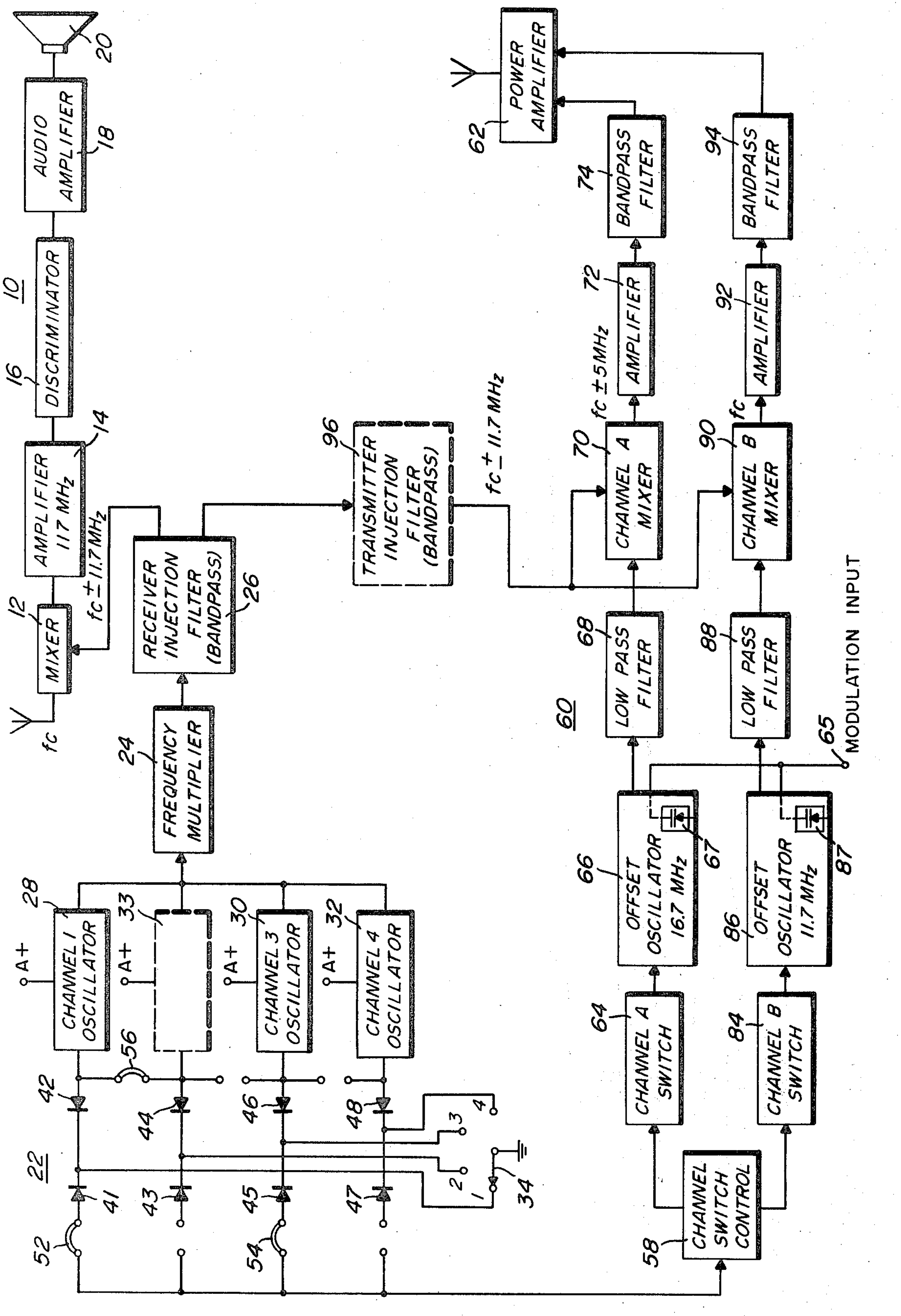
AUDIO AMPLIFIER
DISCRIMINATOR
AMPLIFIER 11.7 MHz
MIXER
fc
fc ± 11.7 MHz
RECEIVER INJECTION FILTER (BANDPASS)
FREQUENCY MULTIPLIER
CHANNEL 1 OSCILLATOR
CHANNEL 3 OSCILLATOR
CHANNEL 4 OSCILLATOR
A+
TRANSMITTER INJECTION FILTER (BANDPASS)
POWER AMPLIFIER
BANDPASS FILTER
AMPLIFIER
fc ± 5 MHz
CHANNEL A MIXER
CHANNEL B MIXER
LOW PASS FILTER
OFFSET OSCILLATOR 16.7 MHz
OFFSET OSCILLATOR 11.7 MHz
CHANNEL A SWITCH
CHANNEL B SWITCH
CHANNEL SWITCH CONTROL
MODULATION INPUT

OFFSET OSCILLATOR SYSTEM FOR RADIO TRANSMITTER AND RECEIVER

BACKGROUND

FIELD OF INVENTION

This invention relates generally to radio frequency oscillators, and more particularly to oscillator systems for providing a local oscillator signal for a receiver and an exciter signal for a radio transmitter.

There are many applications wherein it is necessary to provide a relatively clean signal, that is relatively free from spurious frequencies and that has a stable oscillation frequency. One such application is in a radio transceiver wherein it is necessary to provide a highly stable alternating current signal to the mixer of a superheterodyne receiver, and another highly stable signal for amplification, modulation and subsequent transmission by the transmitter.

Several techniques for providing highly stable radio frequency signals to determine the operating frequency of a radio transceiver are known. One such system utilizes separate crystal controlled oscillators to provide the local oscillator signal for the receiver and the excitation signal for the transmitter. Another such system utilizes a single oscillator to provide both the local oscillator and the excitation signal.

Whereas these techniques provide a way for determining the operating frequencies of a transmitter and a receiver, the first technique requires a separate crystal for the transmitter and the receiver, and requires that two crystals be changed when the operating frequency of the transceiver is changed. The second technique reduces the number of crystals that must be changed to change the operating frequency of the transceiver, however, the operating frequency of the transmitter generally is not equal to the operating frequency of the receiver, but is inherently offset therefrom by the frequency of the intermediate frequency amplifiers of the receiver. In addition, because of the relatively high frequency excitation required in a frequency modulated transmitter, the excitation oscillator cannot be directly frequency modulated without adversely affecting the frequency stability of the oscillator.

SUMMARY

It is an object of the present invention to provide an improved oscillator system for a radio transceiver wherein the operating frequency of the transceiver can be changed by changing only a single oscillator crystal.

It is a further object of this invention to provide an oscillator system for a radio transceiver wherein the operating frequencies of the transmitter and receiver can be independently chosen.

It is another object of this invention to provide an oscillator system for a radio transmitter that can be frequency modulated without adversely affecting the frequency stability of the transmitted signal.

In accordance with a preferred embodiment of the invention, a local oscillator injection signal is provided for the receiver by means of a crystal controlled oscillator and a series of frequency multipliers. The excitation signal for the transmitter is generated by mixing the local oscillator injection signal from the frequency multipliers with another signal from an offset oscillator operating at a frequency substantially lower than the frequency of the injection signal. The operating frequency of the offsetting oscillator determines the operating frequency of the transmitter with respect to the operating frequency of the receiver. The operating frequencies of both the transmitter and the receiver can be readily changed by changing the local oscillator crystal. The transmitter can be frequency modulated by direct frequency modulation of the offsetting oscillator. The frequency stability of the transmitter is not adversely affected by the frequency modulation process because frequency modulation of a relatively low frequency oscillator, such as the offsetting oscillator, does not introduce substantial frequency instability.

DESCRIPTION OF THE DRAWING

In the drawing:

The single FIGURE is a block diagram of the oscillator system according to the invention as used in a radio transceiver.

DETAILED DESCRIPTION

Referring to the FIGURE, there is shown a radio receiver, generally denoted by the numeral 10, comprising a mixer 12, an intermediate frequency amplifier 14 operating at 11.7 MHz, a discriminator 16, an audio amplifier 18 and a loudspeaker 20. Local oscillator injection for the receiver is provided, in this embodiment, by a bank of oscillators 22, a frequency multiplier 24 and a receiver injection filter 26 connected together to form a first oscillator means. However, it should be noted that any oscillator means providing the desired frequency may be used and still fall within the scope of the invention. The bank of oscillators, in this embodiment, comprises three oscillators 28, 30 and 32, the frequencies of which may be controlled by quartz crystals or other frequency determining means. A fourth oscillator may be provided in the space 33, provided for that purpose, if desired. The oscillators are controlled by a switching circuit comprising diodes 41–48, a switch 34 connected to the diodes and to ground, or other reference potential, and jumpers 52, 54 and 56, which interconnect the various oscillators and which connect the diodes to a channel control switch 58.

A transmitter 60, capable of operating at two ranges of widely separated frequencies, in this embodiment, 5 MHz, employs a common power amplifier 62 and a power amplifier exciter system comprising two separate parallel paths for exciting the power amplifier 62, each path being used for one of the widely spaced ranges of frequencies. The first path includes a channel A switch 64 connected to the channel control switch 58 and a second oscillator means including an offset oscillator 66 which operates at 16.7 MHz. A channel A mixer 70 is connected to the offset oscillator 66 through a low pass filter 68 and to an amplifier 72, which is connected to the power amplifier 62 through a filter 74. A second similar exciter path is provided by a channel B switch 84 connected to the channel control switch 58, a second offset oscillator 86, operating at 11.7 MHz, connected to the channel B switch 84, a low pass filter 88, a channel B mixer 90, an amplifier 92 and a filter 94 connected to provide signals to the power amplifier 62. The oscillators 66 and 86 each contain a voltage variable reactance element, such as voltage variable capacitors 67 and 87, respectively, coupled to a modulating signal input point 65 for frequency modulating the transmitter. The channel A mixer and the channel B mixer are connected to a second output of the receiver injection filter 26, which is a bandpass filter tuned to pass the injection frequencies, through an optional transmitter injection filter 96, which is a similar bandpass filter used to prevent interaction between the transmitter and receiver if it is necessary to operate the transmitter and receiver simultaneously. The receiver injection filter 26 has two outputs to provide isolation between the receiver 10 and transmitter 60.

The operation of the receiver 10 is relatively straightforward. Received signals are applied to the mixer 12 and mixed with a signal from the receiver injection filter 26, which has a frequency that is offset 11.7 MHz from the received signal, to generate an intermediate frequency signal having a frequency of 11.7 MHz. The 11.7 MHz signal is amplified by the IF amplifier 14, detected by the discriminator 16 and amplified by the audio amplifier 18 for reproduction by the loudspeaker 20. Although an FM receiver having an 11.7 MHz IF has been shown in this embodiment, it should be noted that the oscillator injection system herein described may also be used with an AM receiver and transmitter, and any IF amplifier frequency may be used.

The injection signal is generated by one of the oscillators within the oscillator bank 22 and frequency multiplied by the frequency multiplier 24 for application to the receiver injection filter 26 which removes spurious harmonic components generated by the multiplier 24 before the injection signal is applied to the mixer 12. Each of the oscillators 28, 30 and 32 is connected to the power supply A+, and is rendered operative through the application of a ground return thereto, the latter being standard operation in a communications radio. The ground return is provided by the selector switch 34 and the diodes 42, 44, 46 and 48 connected thereto. The selector switch 34 is a four position switch in this embodiment and connects the cathode of one of the diodes 42, 44, 46 or 48 to ground to provide a ground return to energize the oscillator connected to the diode thus selected.

When the channel selector switch 34 is in position 1, as shown, the cathodes of diodes 41 and 42 are grounded, thereby providing a ground return for the oscillator 28 through the diode 42 and for the channel switch control 58 through the diode 41 and jumper 52. Applying the ground return to the oscillator 28 causes the oscillator 28 to operate and to determine the frequency of operation of the receiver. Grounding the input to the channel switch control 58 causes the switch control to apply a signal to the channel A switch 64 to energize the 16.7 MHz oscillator 66. When the selector switch 34 is in position 2, the cathodes of the diodes 43 and 44 are grounded and a ground return is provided to the oscillator 28 through the diode 44 and the jumper 56. No jumper is connected between the diode 43 and the channel switch control 58. Leaving the input to the channel switch control 58 ungrounded causes the channel switch control to apply a signal to the 11.7 MHz oscillator 86 to cause oscillator 86 to operate, thereby changing the transmitting frequency, while maintaining the same receiving frequency. Similarly, placing the selector switch 34 in position 3 energizes oscillator 30 and oscillator 66, while placing the switch 34 in position 4 energizes the oscillators 32 and 86. While only jumpers 52, 54 and 56 are shown, jumpers may be connected to the diode matrix as necessary to energize any combination of oscillators. The use of jumpers and the diode matrix provides great flexibility in oscillator selection and allows both the transmit and receive frequencies to be changed by means of a single pole switch.

When the 11.7 MHz oscillator 86 has been energized by the channel B switch 84 in response to the channel switch control 58, the oscillator 86 provides an 11.7 MHz signal to the filter 88. The filter 88 is a low pass filter which attenuates the harmonics of the 11.7 MHz signal from the oscillator 86. The 11.7 MHz signal from the filter 88 is applied to the channel B mixer 90 along with the injection signal from either the transmitter injection filter 96, when provided, or the receiver injection filter 26. The receiver injection filter 26 has separate outputs, which are connected to different points in the filter, to provide isolation between the transmitter and receiver. Since the injection signal is offset by 11.7 MHz from the signal to be received by the receiver 10, mixing the injection signal in the channel B mixer 90 with the 11.7 MHz signal from the oscillator 86 provides a signal having a frequency equal to the receiving frequency of the receiver 10 to the amplifier 92. The signal from the channel B mixer 90 is amplified by the amplifier 92 and filtered by the bandpass filter 94 to remove spurious signal components generated by the mixing process and further amplified by the power amplifier 62 for transmission.

In this embodiment, when the channel B exciter path has been selected, the transmitting frequency of the transmitter 60 is equal to the receiving frequency of the receiver 10. The transmitting frequency can be readily changed by changing the frequency of the offset oscillator 86 provided that the frequency is not changed so excessively as to fall outside of the pass band of either filter 88 or 94. In the transmitter described, the frequency of the offset oscillator 86 can be changed several hundred kilohertz before the filters 88 or 94 begin to excessively attenuate the signal.

Where greater offsets between transmitting frequencies are required, as in the transmitter shown in the FIGURE, a second exciter path is necessary. When the 16.7 MHz offset oscillator 66 is energized, and the 16.7 MHz signal provided thereby is mixed with the receiver injection signal in the channel A mixer 70 to provide a signal that is offset from the receiving frequency by 5 MHz to the amplifier 72 for transmission by the transmitter 60.

The offsetting capability provided by the instant invention is particularly useful for mobile radio applications, particularly in the presently allocated 450–470 MHz band wherein fixed base stations and mobile stations each transmit and receive on frequencies that are offset from each other by exactly 5 MHz, and in the 470–512 MHz band wherein the offset is 3 MHz. Hence, the system of the present invention provides a transmitter which can transmit on frequencies that are receivable by either base station or mobile receivers by the selection of the appropriate frequency offsetting oscillator 66 or 86. This system has a particular advantage in multi-channel radios. For example, in prior art systems wherein it is necessary to communicate with both base station and mobile receivers on 12 frequencies, 36 frequency determining oscillators or crystals are required. 12 are required for receiving the 12 frequencies, 12 are required for transmitting to mobile stations and 12 more are required for transmitting to base stations. In the present system, only 14 oscillators or crystals are required, 12 for the receiver and two offsetting oscillators, thereby providing a saving of 22 oscillators or crystals.

The offsetting techniques of the present invention provide a convenient way to frequency modulate the transmitter. Frequency modulation is achieved by frequency modulating the offset oscillators 66 and 86. Modulating the oscillators 66 and 86 by applying a modulating signal to point 65, causes a frequency modulated signal, which is subsequently amplified and transmitted, to appear at the outputs of the mixers 70 and 90, respectively. The offset oscillators 66 and 86 may be frequency modulated using conventional techniques such as, for example, by coupling the voltage variable capacitors 67 and 87 to the crystals or other frequency determining networks of the oscillators.

When a frequency modulating element, such as a voltage variable capacitor, is included in a stable oscillator, such as a crystal oscillator, the frequency stability of the oscillator is degraded. Because no frequency multipliers are used to multiply the frequency of the output signal from the offset oscillator 66 and 86, the frequency instability caused by the frequency modulating networks within the oscillators 66 and 86 is translated directly to the carrier frequency by the channel A and channel B mixers 70 and 90, respectively, and is not frequency multiplied by a frequency multiplier as in prior art systems wherein no offsetting oscillator is used and a frequency determining oscillator, analogous to one of the oscillators in the oscillator bank 22, is modulated. Since the frequency of the frequency determining oscillator is multiplied by 24 to 27 times in a transmitter operating at 450–470 MHz, to provide a signal having a frequency of 450–470 MHz any frequency instability introduced by frequency modulating the frequency determining oscillator is multiplied by the 24 to 27 times multiplication factor of the multiplier. This problem is avoided by the system of the instant invention because the frequency of the offsetting oscillators 68 and 88 is translated by the offsetting mixers 70 and 90, and instabilities introduced by the frequency modulating networks attached to the oscillators are not multiplied. Furthermore, only the offsetting oscillators need be frequency modulated, and frequency modulating each frequency determining oscillator, as in prior art systems, is unnecessary.

Although the increase in instability in the foregoing example arose as a result of the frequency multiplication, it can be shown mathematically that the same instability would result if the 450–470 MHz signals were generated directly, and that the absolute instability for a given quality oscillator is proportional to its operating frequency. Therefore, the improvement in stability achieved by frequency modulating the offsetting oscillator rather than the frequency determining oscillator is proportional to the ratio of the operating frequency of the transmitter to the frequency of the offset oscillator 66 or 86. The advantage becomes substantial when the operating frequency of the transmitter is relatively high compared to the offset frequency, and is even substantial in the 50 MHz land mobile radio band wherein the ratio of the operating frequency to the offset frequency may be as low as four.

Hence, it can be seen that the instant invention provides a convenient way to provide a multi-frequency transceiver at a substantial cost saving due to a reduction in the number of frequency determining oscillators or crystals necessary. Furthermore the instant invention provides a convenient way to frequency modulate a transmitter directly without using a separate phase modulator or modulating each frequency determining oscillator. The direct frequency modulation is achieved without a substantial degradation in transmitter stability because the frequency modulated oscillator is not followed by frequency multiplication stages, which, in the prior art, multiply the frequency instability caused by the modulating circuit by the multiplication factor thereof.

Whereas a particular embodiment of the instant invention has been shown, it should be noted that any embodiment employing the basic concepts described in the foregoing disclosure still fall within the scope and spirit of the invention.

I claim:

1. In a radio transceiver system including a transmitter and a superheterodyne receiver having a mixer stage, a system for determining the frequency of operation of the transceiver including in combination:

first oscillator means connected to said mixer stage for providing oscillations having a first predetermined frequency thereto for causing said mixer stage to produce a first beat frequency signal in response to said oscillations;

second oscillator means for providing oscillations having a second predetermined frequency, said second frequency being predeterminedly related to the frequency of said first beat frequency signal;

mixer means connected to said first and second oscillator means for receiving said first and second frequency oscillations therefrom, said mixer means being further connected to said transmitter for providing a second beat frequency signal thereto in response to said first and second frequency oscillations for determining the operating frequency of said transmitter;

means connected to said second oscillator means for modulating the frequency of said second frequency oscillations to thereby modulate the operating frequency of said transmitter;

third oscillator means for providing oscillations having a third predetermined frequency, said third predetermined frequency being predeterminedly related to the frequency of said first beat frequency signal;

second mixer means connected to said first and third oscillator means for receiving said first and third frequency oscillations therefrom, said second mixer means being further connected to said transmitter for providing a third beat frequency signal thereto in response to said first and third frequency oscillations for determining the operating frequency of said transmitter;

means connected to said third oscillator means for modulating the frequency of said third frequency oscillations to thereby modulate the operating frequency of said transmitter;

switch means connected to said second and third oscillator means for selectively rendering one of said second and third oscillator means operative;

a diode matrix including a plurality of diodes connected to said first oscillator means for changing the frequency of operation of said first oscillator means, and to said switch means for determining the one of said second and third oscillator means rendered operative thereby; and selector switch means connected to said matrix for causing said matrix to operate said first oscillator means at a predetermined frequency and for causing said switch means to render a predetermined one of said second and third oscillators operative.

2. A system as recited in claim 1 wherein said first oscillator means includes a plurality of frequency determining oscillators, each frequency determining oscillator being connected to at least one diode of said plurality of diodes.

3. A system as recited in claim 2 wherein said selector switch means is further connected to at least one diode of said plurality of diodes.

4. A system as recited in claim 3 further including jumper means for selectively connecting predetermined ones of said diodes to predetermined ones of said frequency determining oscillators and said switch means.

5. A system as recited in claim 4 wherein said second and third oscillator means have different frequencies of oscillation, the difference in said oscillation frequencies being 5 MHz.

6. A system as recited in claim 4 wherein said second and third oscillator means have different frequencies of oscillation, the difference in said oscillation frequencies being 3 MHz.

7. A system as recited in claim 3 wherein said selector switch means includes a selector switch connected to each of said diodes.

* * * * *